Patented Apr. 2, 1946

2,397,826

UNITED STATES PATENT OFFICE 2,397,826

PRODUCTION OF DIALKYL ETHERS

Herbert J. West, Riverside, Conn., assignor to American Cyanamid Company, New York, N. Y., a corporation of Maine No Drawing. Original application July 26, 1941, Serial No. 404,203. Divided and this application December 30, 1941, Serial No. 424,949

4 Claims. (Cl. 260—553)

This invention relates to the production of dialkyl ethers of dimethylol urea and is more particularly concerned with the production of the dimethyl and di-ethyl ethers.

Many and varying processes have been suggested and used for the production of the ethers of dimethylol urea by the reaction of the latter material with various alcohols. When the higher alcohols are used in this reaction, the process is relatively simple and yields are sufficiently good for commercial purposes. However, in the production of the methyl and ethyl ethers, on a commercial scale, the yields obtained are much lower and, as a result, the large scale production of these ethers has not been found to be practicable.

As described in my application Serial No. 404,203 filed July 26, 1941, of which this is a division, I have found that these alkyl ethers of dimethylol urea may be prepared commercially by a simple and economical process with a practically 100% yield of theoretical. Stated generally, the process involves the reaction of the alcohols with dimethylol urea under acid conditions at a pH below 4 and at a temperature below 30° C., the acidity of the reaction mixture being regulated by the use of such acids as can be removed from the solution by precipitation with a base capable of forming a salt with the acid substantially insoluble in the reaction mixture, thus giving a solution free from electrolytes.

The following is one specific method of carrying out my process which is not limited to the details set forth, parts being given by weight.

To 100 parts of crystalline dimethylol urea from any suitable source, are added 200 parts of methyl alcohol. ⅓ part of oxalic acid crystals are added and the mixture is stirred at a temperature below 30° C. until a clear solution having a pH of 2.8 is obtained indicating that reaction is complete. To the reaction mixture is added sufficient barium hydroxide to precipitate barium oxalate and thereby remove the oxalic acid from the solution. A slight excess of barium hydroxide is used to give a pH of 7.5–8.0. The precipitated barium oxalate is removed by filtration and the filtrate is concentrated in vacuo (26–28 inches) by heating to a temperature not exceeding 50° C. until the greater part of the excess methyl alcohol and water has been removed. At this point, the solution contains about 60% solids.

The ether solution is further concentrated in vacuo as above, the heating and concentration being continued until a temperature of about 90° C. is reached. At this time the last traces of water are removed by adding toluol in an amount equal to about 20% of the calculated yield, and distillation is continued in vacuo at about 80° C. until the toluol and water are removed. The resultant product is a clear melt which may then be dumped in trays or the like and allowed to harden to a mass which is resinous in general appearance but which consists of crystals bonded together with a resinous material. The nitrogen content of this resinous or semi-crystalline product indicates a degree of purity equivalent to 104% since the product contains about 90% of the dimethyl ether of dimethylol urea and about 10% partially demethylated ether.

In place of the methyl alcohol in the above example I may utilize ethyl alcohol to prepare the corresponding di-ethyl ethers of dimethylol urea. Likewise other alcohols may be substituted, e. g., propyl, butyl, etc. In place of oxalic acid and barium hydroxide there may be used such other combinations of acids and bases as will produce a salt substantially insoluble in the reaction mixture. Acids include phosphoric and sulfuric and bases include calcium or magnesium hydroxide, etc. Benzol or other suitable hydrocarbon may be used in place of the toluol. The ratios of the reacting materials may be varied to some extent without affecting the final products.

The ethers are particularly well adapted for blending with alkyd resins, preferably in accordance with the procedure described in my copending application Serial No. 427,025 filed January 16, 1942. The ethers alone or blended with the alkyd resin form exceedingly valuable coating materials such as lacquers or the like. These ethers may also be mixed with various cellulose esters and ethers in suitable solvents.

Suitable other changes and variations may be made in carrying out the invention without departing from the spirit and scope thereof as defined in the appended claims.

I claim:

1. The process which comprises preparing a mixture of dimethylol urea with an aliphatic alcohol selected from the group consisting of methyl and ethyl alcohols and an acid capable of forming an insoluble metal salt, the amount of acid being such as to make the mix more acid than pH 4, reacting the mixture at temperatures below 30° C. until a clear solution is obtained, adding a soluble metal compound of the nature and in an amount sufficient to remove the acid as an insoluble metal salt, removing the precipitated metal salt, concentrating the remaining solution in vacuo until a temperature of about 90° C. is reached and removing the rest of the water by adding toluol and distilling at about 80° C.

2. The process which comprises preparing a mixture of dimethylol urea with an aliphatic alcohol selected from the group consisting of methyl and ethyl alcohols and oxalic acid in an amount sufficient to make the mixture more acid than pH 4, reacting the mixture below 30° C. until a clear solution is obtained, adding sufficient barium hydroxide to the solution to give a pH of about 7.5, removing precipitated barium oxalate, concentrating the remaining solution in vacuo until a temperature of about 90° C. is reached and removing the rest of the water by adding toluol and distilling at about 80° C.

3. The process which comprises preparing a mixture of dimethylol urea with methyl alcohol and oxalic acid in an amount sufficient to make the mixture more acid than pH 4, reacting the mixture below 30° C. until a clear solution is obtained, adding sufficient barium hydroxide to the solution to give a pH of about 7.5, removing precipitated barium oxalate, concentrating the remaining solution in vacuo until a temperature of about 90° C. is reached and removing the rest of the water by adding toluol and distilling at about 80° C.

4. A process which comprises preparing a mixture of dimethylol urea with methyl alcohol, and an acid capable of forming an insoluble metal salt, the amount of acid being such as to make the mix more acid than pH 4, reacting the mixture at temperatures below 30° C. until a clear solution is obtained, adding a soluble metal compound of the nature and in an amount sufficient to remove the acid as an insoluble metal salt, removing the precipitated metal salt, concentrating the remaining solution in vacuo until a temperature of about 90° C. is reached and removing the rest of the water by adding toluol and distilling at about 80° C.

HERBERT J. WEST.